US012410752B2

(12) United States Patent
Miller et al.

(10) Patent No.: US 12,410,752 B2
(45) Date of Patent: Sep. 9, 2025

(54) SYSTEM AND METHOD OF DETECTING AN AIRFLOW FAULT CONDITION

(71) Applicant: General Electric Company, Schenectady, NY (US)

(72) Inventors: Brandon Wayne Miller, Liberty Township, OH (US); Jeffrey Douglas Rambo, Mason, OH (US); Daniel Alan Niergarth, Norwood, OH (US); Scott Alan Schimmels, Miamisburg, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/483,229

(22) Filed: Sep. 23, 2021

(65) Prior Publication Data

US 2023/0090415 A1 Mar. 23, 2023

(51) Int. Cl.
*F02C 7/18* (2006.01)
*F02C 9/18* (2006.01)

(52) U.S. Cl.
CPC ................ *F02C 7/185* (2013.01); *F02C 9/18* (2013.01); *F05D 2260/213* (2013.01); *F05D 2260/232* (2013.01); *F05D 2260/606* (2013.01); *F05D 2260/80* (2013.01); *F05D 2270/3015* (2013.01); *F05D 2270/303* (2013.01); *F05D 2270/3062* (2013.01)

(58) Field of Classification Search
CPC ...... F02C 7/185; F02C 9/18; F05D 2260/213; F05D 2260/232; F05D 2260/606; F05D 2260/80; F05D 2270/3015; F05D 2270/303; F05D 2270/3062; F24F 11/36; F28F 2250/06; F28F 265/16; F28F 1/003
See application file for complete search history.

(56) References Cited

U.S. PATENT DOCUMENTS

| | | | |
|---|---|---|---|
| 2,571,166 | A | 10/1951 | Rossetto |
| 2,711,074 | A | 6/1955 | Howard |
| 3,043,560 | A | 7/1962 | Varadi |

(Continued)

FOREIGN PATENT DOCUMENTS

| | | | |
|---|---|---|---|
| CN | 1603596 | A | 4/2005 |
| CN | 101576024 | A | 11/2009 |

(Continued)

OTHER PUBLICATIONS

U.S. Appl. No. 17/159,422, filed Jan. 27, 2021.
LM5000, MTU Aero Engines, 2017, 3 Pages.

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A method of detecting an airflow fault condition in a gas turbine engine, the method including: operating the gas turbine engine with a thermal transport bus having an intermediary heat exchange fluid flowing therethrough; determining a performance characteristic of the intermediary heat exchange fluid in the thermal transport bus is outside of a predetermined range, wherein the performance characteristic includes a temperature, a pressure, a flowrate, or a combination thereof; and indicating an airflow fault condition in response to determining the performance characteristic is outside of the predetermined range.

16 Claims, 6 Drawing Sheets

(56) References Cited

U.S. PATENT DOCUMENTS 3,522,008 A 7/1970 Defabaugh et al.
3,779,007 A 12/1973 Lavash
4,138,856 A 2/1979 Orlowski
4,199,975 A 4/1980 Schrock et al.
4,254,618 A 3/1981 Elovic
4,466,481 A 8/1984 Wilson et al.
4,546,605 A 10/1985 Mortimer et al.
4,571,935 A 2/1986 Rice
4,688,627 A 8/1987 Jean-Luc et al.
4,722,666 A 2/1988 Dennison et al.
5,074,109 A 12/1991 Mandet et al.
5,305,616 A 4/1994 Coffinberry
5,408,965 A 4/1995 Fulton et al.
5,544,700 A 8/1996 Shagoury
5,645,397 A 7/1997 Soechting et al.
5,697,209 A 12/1997 Wettstein
5,834,632 A 11/1998 Olender et al.
6,098,395 A * 8/2000 North ...................... F01D 5/085 60/782
6,106,229 A 8/2000 Nikkanen et al.
6,217,758 B1 4/2001 Lee
6,253,554 B1 7/2001 Kobayashi et al.
6,484,508 B2 11/2002 Rocklin et al.
6,487,863 B1 12/2002 Chen et al.
6,502,403 B1 1/2003 Tazaki et al.
6,553,753 B1 4/2003 Payling et al.
6,578,362 B1 6/2003 Coffinberry
6,672,072 B1 1/2004 Giffin, III
7,174,773 B2 2/2007 Borzabadi et al.
7,536,865 B2 5/2009 Mikhail
7,607,307 B2 10/2009 Bergholz
7,607,354 B2 10/2009 Jacobsen
7,836,680 B2 11/2010 Schwarz et al.
7,886,580 B2 2/2011 Kumar et al.
8,261,593 B1 9/2012 Sanders
8,291,748 B2 10/2012 Kumar et al.
8,511,986 B2 8/2013 Alvanos et al.
8,585,358 B2 11/2013 Matsuo et al.
8,591,102 B2 11/2013 Frach et al.
8,747,055 B2 6/2014 McCune et al.
8,776,866 B2 7/2014 Cederberg et al.
9,097,182 B2 8/2015 Chillar et al.
9,200,855 B2 12/2015 Kington et al.
9,322,685 B2 4/2016 Ray
9,328,978 B2 5/2016 Appukuttan et al.
9,410,482 B2 8/2016 Krautheim et al.
9,458,764 B2 10/2016 Alecu et al.
9,474,186 B2 10/2016 Campbell et al.
9,739,546 B2 8/2017 Bertilsson et al.
9,829,259 B2 11/2017 Nyander et al.
10,100,736 B2 10/2018 Niergarth et al.
10,196,928 B2 2/2019 Adibhatla et al.
10,260,425 B2 4/2019 Crowley et al.
10,287,028 B2 5/2019 Ripley et al.
10,352,243 B2 7/2019 Mizukami et al.
10,358,847 B2 7/2019 Nakazawa et al.
10,400,623 B2 9/2019 Everwyn et al.
10,487,739 B2 11/2019 Miller et al.
11,261,792 B2 3/2022 Niergarth et al.
2003/0035717 A1 2/2003 Tiemann
2004/0221584 A1 11/2004 Hoffmann et al.
2004/0255571 A1 12/2004 Fetescu et al.
2005/0081529 A1 4/2005 Bolis et al.
2005/0236139 A1 10/2005 Konruff et al.
2006/0042223 A1 3/2006 Walker et al.
2007/0022732 A1 2/2007 Holloway et al.
2007/0157626 A1 7/2007 Bergholz
2009/0134243 A1 5/2009 Mount et al.
2009/0229812 A1 9/2009 Pineo et al.
2010/0139288 A1 6/2010 Rago
2010/0180571 A1 7/2010 Zysman et al.
2010/0192593 A1 8/2010 Brown et al.
2011/0150634 A1 6/2011 Bajusz et al.
2011/0162387 A1 7/2011 Chir et al.
2012/0111095 A1 5/2012 Sheehan
2013/0036747 A1 2/2013 Fuchs et al.
2013/0104564 A1 5/2013 Arar
2013/0186100 A1 7/2013 Rhoden et al.
2013/0247587 A1 9/2013 Lo
2014/0010639 A1 1/2014 Snape et al.
2014/0123657 A1 5/2014 Tham et al.
2014/0123675 A1 5/2014 Tham et al.
2014/0205446 A1 7/2014 Patsouris et al.
2014/0230444 A1 8/2014 Hao et al.
2014/0271118 A1 9/2014 Junod
2015/0114611 A1 4/2015 Morris et al.
2015/0125264 A1 5/2015 Lighty et al.
2015/0314877 A1* 11/2015 McAuliffe ............. B64D 13/06 62/61
2016/0091262 A1 3/2016 Chainer et al.
2016/0108814 A1 4/2016 Schmitz
2016/0326963 A1 11/2016 Yamazaki
2016/0341126 A1 11/2016 Kupratis et al.
2017/0030266 A1 2/2017 Cerny et al.
2017/0044984 A1 2/2017 Pesyna et al.
2017/0114721 A1 4/2017 Miller et al.
2017/0130606 A1 5/2017 Niergarth et al.
2017/0159566 A1 6/2017 Sennoun et al.
2017/0167382 A1 6/2017 Miller et al.
2017/0184027 A1 6/2017 Moniz et al.
2017/0248333 A1 8/2017 Varley et al.
2017/0260905 A1 9/2017 Schmitz
2018/0306052 A1* 10/2018 Lammers ................ F01D 17/08
2018/0334965 A1 11/2018 Ortiz et al.
2018/0347472 A1 12/2018 Ortiz et al.
2019/0112977 A1* 4/2019 Kim ........................ F01K 23/10
2019/0218971 A1 7/2019 Niergarth et al.
2019/0383564 A1 12/2019 Miller et al.
2020/0088102 A1* 3/2020 Roberge .................. F02C 7/224
2020/0191680 A1 6/2020 Cipullo et al.

FOREIGN PATENT DOCUMENTS

CN 101806652 B 11/2011
CN 102162765 B 6/2012
CN 203441604 U 2/2014
CN 103604862 B 12/2015
CN 105579688 A 5/2016
CN 107035528 A 8/2017
DE 102006003586 7/2007
EP 1149998 A2 10/2001
EP 1715320 A2 10/2006
EP 2418367 A1 2/2012
EP 3514349 A1 7/2019
FR 3097963 A1 1/2021
GB 937826 A 9/1963
GB 1357112 A 6/1974
GB 1358076 A 6/1974
GB 2034822 A 6/1980
GB 2342693 A 4/2000
JP 0437807 U 3/1992
JP H05332164 A 12/1993
JP H06323163 A 11/1994
JP H07208200 A 8/1995
JP H09310624 A 12/1997
JP H1035266 A 2/1998
JP 2002174458 A 6/2002
KR 20150061229 A 6/2015
WO WO0131181 A1 5/2001
WO WO02/38938 A1 5/2002
WO WO2006/094692 A1 9/2006
WO WO2015/105552 A1 7/2015

* cited by examiner

SYSTEM AND METHOD OF DETECTING AN AIRFLOW FAULT CONDITION

FIELD

In general, the present disclosure relates to management of thermal energy in an engine. In particular, the present disclosure relates to a system and method of fault detection using a thermal transport bus in a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

Various accessory systems are included to ensure that the fan and/or core operate as desired. For example, a main lubrication system provides lubrication to, e.g., bearings and gear meshes within a compressor section, a turbine section, and a power gear box (if provided). In addition to the lubricating properties provided to such components, the main lubrication system can be used to remove heat from such components such that they operate within a desired temperature range.

Other accessory systems of the gas turbine engine, such as an environmental control system, also require heat removal during operation. Accordingly, gas turbine engines typically include numerous heat exchangers, each heat exchanger dedicated to an individual accessory system of the gas turbine engine.

In existing thermal energy management systems, thermal transport buses are used to manage the transfer of thermal energy among various heat exchangers. During operation of the gas turbine engine, airflow fault conditions, such as broken pipes, may occur. The inventors of the present disclosure have found that such broken pipes may create various operational issues within the gas turbine engine and thermal energy management systems, and thus improvements to address these issues would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
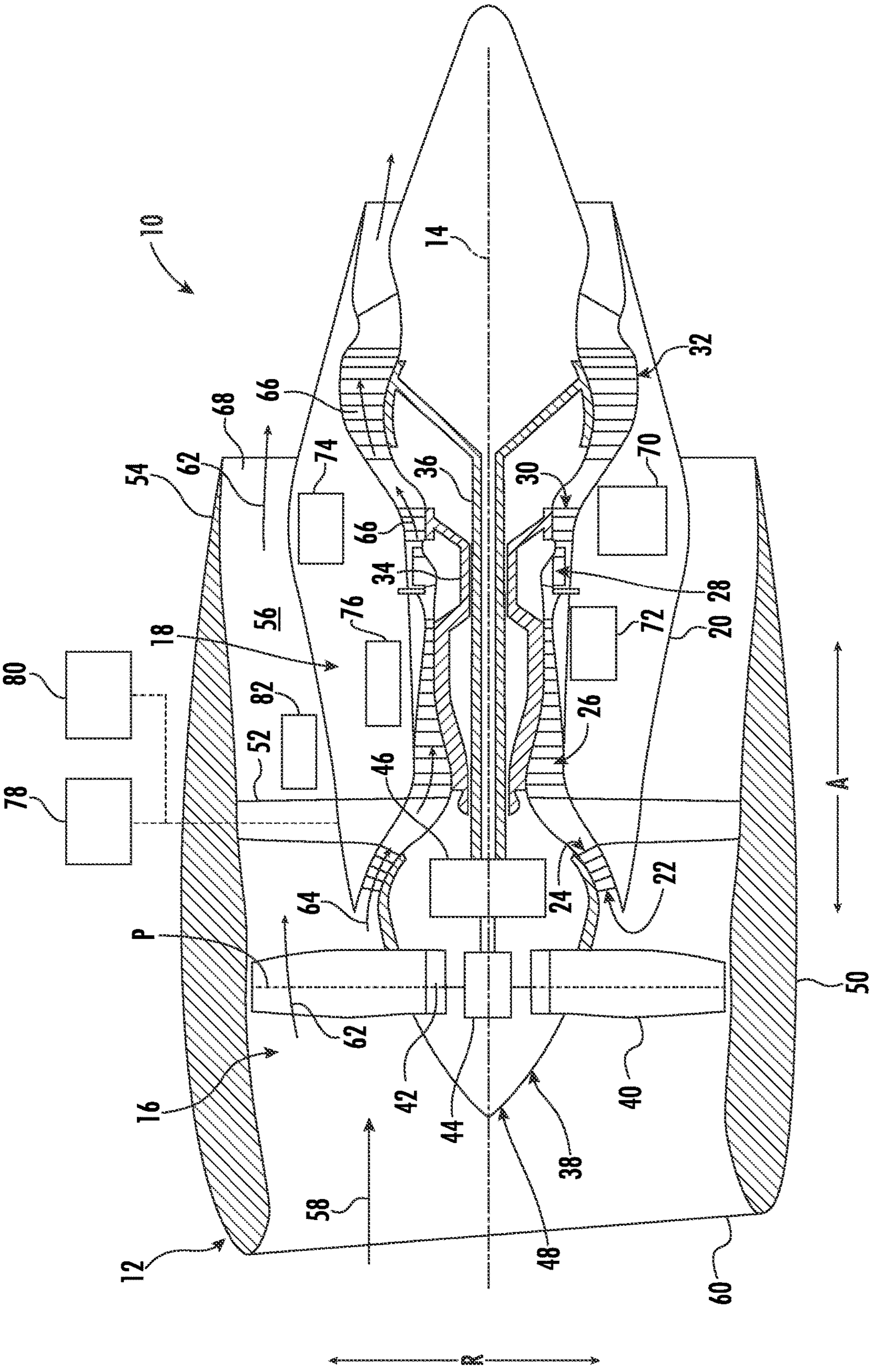
FIG. 1 is a schematic, cross-sectional view of an exemplary gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the illustrated embodiments as oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Aspects of the present disclosure present a method of detecting an airflow fault condition in a gas turbine engine and reconfiguring a cooling airflow scheme in response to the airflow fault condition. For example, a thermal transport bus is used to detect an air side broken pipe by sensing a change (e.g., gradual, instantaneous) in a thermal performance characteristic (e.g., temperature, pressure) of an intermediary heat exchange fluid of the thermal transport bus. Also disclosed is a means to divert flow away from a damaged heat exchanger to an operational heat exchanger by way of modifying a configuration of airflow in the gas turbine engine in response to the indicated airflow fault condition, and optionally modifying a configuration of thermal fluid flow within the thermal transport bus. Benefits of the disclosed method include improved fuel burn by the engine, improved reliability of the thermal managements system(s), reduced need for bleed air, and a reduced weight of the engine.

Referring now to the drawings, wherein identical numerals indicate the same elements throughout the figures, FIG. 1 is a schematic, cross-sectional view of a propulsion system 10 in accordance with an exemplary embodiment of the present disclosure. More particularly, for the embodiment of FIG. 1, propulsion system 10 includes a gas turbine engine, referred to herein as "turbofan engine 12." In one example, turbofan engine 12 can be a high-bypass turbofan jet engine. As shown in FIG. 1, turbofan engine 12 defines an axial direction A (extending parallel to a longitudinal centerline 14 provided for reference) and a radial direction R. In general, turbofan engine 12 includes a fan section 16 and a turbomachine 18 disposed downstream from fan section 16.

The exemplary turbomachine 18 depicted generally includes a substantially tubular outer casing 20 that defines an annular inlet 22. Outer casing 20 encases, in serial flow order/relationship, a compressor section including a booster or low pressure compressor 24 ("LP compressor 24") and a high pressure compressor 26 ("HP compressor 26"); a combustion section 28; a turbine section including a high pressure turbine 30 ("HP turbine 30") and a low pressure turbine 32 ("LP turbine 32"). A high pressure shaft or spool 34 ("HP spool 34") drivingly connects HP turbine 30 to HP compressor 26. A low pressure shaft or spool 36 ("LP spool 36") drivingly connects LP turbine 32 to LP compressor 24.

For the embodiment depicted, fan section 16 includes a variable pitch fan 38 having a plurality of fan blades 40 coupled to a disk 42 in a spaced apart manner. As depicted, fan blades 40 extend outwardly from disk 42 generally along radial direction R. Each fan blade 40 is rotatable relative to disk 42 about a pitch axis P by virtue of fan blades 40 being operatively coupled to a suitable actuation member 44 configured to collectively vary the pitch of fan blades 40, e.g., in unison. Fan blades 40, disk 42, and actuation member 44 are together rotatable about longitudinal centerline 14 by LP spool 36 across a power gear box 46. Power gear box 46 includes a plurality of gears for stepping down the rotational speed of LP spool 36 to a more efficient rotational fan speed.

Referring still to the exemplary embodiment of FIG. 1, disk 42 is covered by a rotatable front hub 48 aerodynamically contoured to promote an airflow through the plurality of fan blades 40. Additionally, fan section 16 includes an annular fan casing or outer nacelle 50 that circumferentially surrounds variable pitch fan 38 and/or at least a portion of turbomachine 18. It should be appreciated that in some embodiments, nacelle 50 is configured to be supported relative to turbomachine 18 by a plurality of circumferentially spaced outlet guide vanes 52. Moreover, a downstream section 54 of nacelle 50 extends over an outer portion of turbomachine 18 so as to define a bypass airflow passage 56 therebetween.

During operation of turbofan engine 12, a volume of air 58 enters turbofan engine 12 through an associated inlet 60 of nacelle 50 and/or fan section 16. As the volume of air 58 passes across fan blades 40, a first portion of air 58 as indicated by arrows 62 is directed or routed into bypass airflow passage 56 and a second portion of air 58 as indicated by arrow 64 is directed or routed into LP compressor 24. The ratio between first portion of air 62 and second portion of air 64 is commonly known as a bypass ratio. The pressure of second portion of air 64 is then increased as second portion of air 64 is routed through high pressure (HP) compressor 26 and into combustion section 28, where second portion of air 64 is mixed with fuel and burned to provide combustion gases 66. Subsequently, combustion gases 66 are routed through HP turbine 30 and LP turbine 32, where a portion of thermal and/or kinetic energy from combustion gases 66 is extracted.

Simultaneously, the pressure of first portion of air 62 is substantially increased as first portion of air 62 is routed through bypass airflow passage 56 before first portion of air 62 is exhausted from a fan nozzle exhaust section 68 of turbofan engine 12, also providing propulsive thrust.

Moreover, as is depicted schematically, turbofan engine 12 further includes various accessory systems to aid in the operation of turbofan engine 12 and/or an aircraft including turbofan engine 12. For example, turbofan engine 12 further includes a main lubrication system 70 configured to provide a lubricant to, e.g., various bearings and gear meshes in the compressor section (including LP compressor 24 and HP compressor 26), the turbine section (including HP turbine 30 and LP turbine 32), HP spool 34, LP spool 36, and power gear box 46. The lubricant provided by main lubrication system 70 increases the useful life of such components and removes a certain amount of heat from such components.

Additionally, turbofan engine 12 includes a compressor cooling air ("CCA") system 72 for providing air from one or both of HP compressor 26 or LP compressor 24 to one or both of HP turbine 30 or LP turbine 32. The CCA system 72 may include a duct and a CCA heat exchanger. The duct may receive an airflow from the compressor section and provide such airflow to the CCA heat exchanger to be cooled. The cooled airflow may then be provided to, e.g., the turbine section to cool various components of the turbine section. Moreover, turbofan engine 12 includes an active thermal clearance control ("ACC") system 74 for cooling a casing of the turbine section to maintain a clearance between the various turbine rotor blades and the turbine casing within a desired range throughout various engine operating conditions. Although not depicted, the ACC system 74 may similarly include a duct for receiving an airflow and providing such airflow to an ACC heat exchanger. Furthermore, turbofan engine 12 includes a generator lubrication system 76 for providing lubrication to an electronic generator. In one example, the electronic generator provides electrical power to a startup electric motor for turbofan engine 12, various other electronic components of turbofan engine 12, and/or an aircraft including turbofan engine 12.

As is also depicted schematically, turbofan engine 12 drives or enables various other accessory systems for an aircraft including turbofan engine 12. For example, turbofan engine 12 provides compressed air from the compressor section to an environmental control system ("ECS") 78. In one example, ECS 78 provides an air supply to a cabin of the aircraft for pressurization and thermal control. Air can be provided from turbofan engine 12 to an electronics cooling system 80 for maintaining a temperature of certain electronic components of turbofan engine 12 and/or the aircraft within a desired range. Additionally, a surface cooler 82 can be included in fan section 16. In this example, surface cooler 82 is a heat sink exchanger. Surface cooler 82 is disposed along a surface (e.g., annular fan casing or outer nacelle 50 that circumferentially surrounds fan 38) of fan section 16. In this example, surface cooler 82 is exposed to (e.g., in thermal communication with) first portion of air 62 flowing through turbofan engine 12. Surface cooler 82 functions by transferring thermal energy from surface cooler 82 into first portion of air 62 either directly via conduction (and/or convection) or indirectly via a sidewall of fan section 16.

It should be appreciated, however, that turbofan engine 12 depicted in FIG. 1 is by way of example only, and that in other exemplary embodiments, aspects of the present disclosure may additionally, or alternatively, be applied to any other suitable gas turbine engine. For example, in other exemplary embodiments, turbofan engine 12 may instead be any other suitable aeronautical gas turbine engine, such as a turbojet engine, turboshaft engine, turboprop engine, etc. Additionally, in still other exemplary embodiments, turbofan engine 12 may include any other suitable number and/or configuration of shafts, spools, compressors, turbines, etc.; may be configured as a direct drive engine (e.g., excluding power gear box 46); may be a fixed-pitch fan; may be an unducted turbofan engine (excluding nacelle 50); etc.

Figure 2:
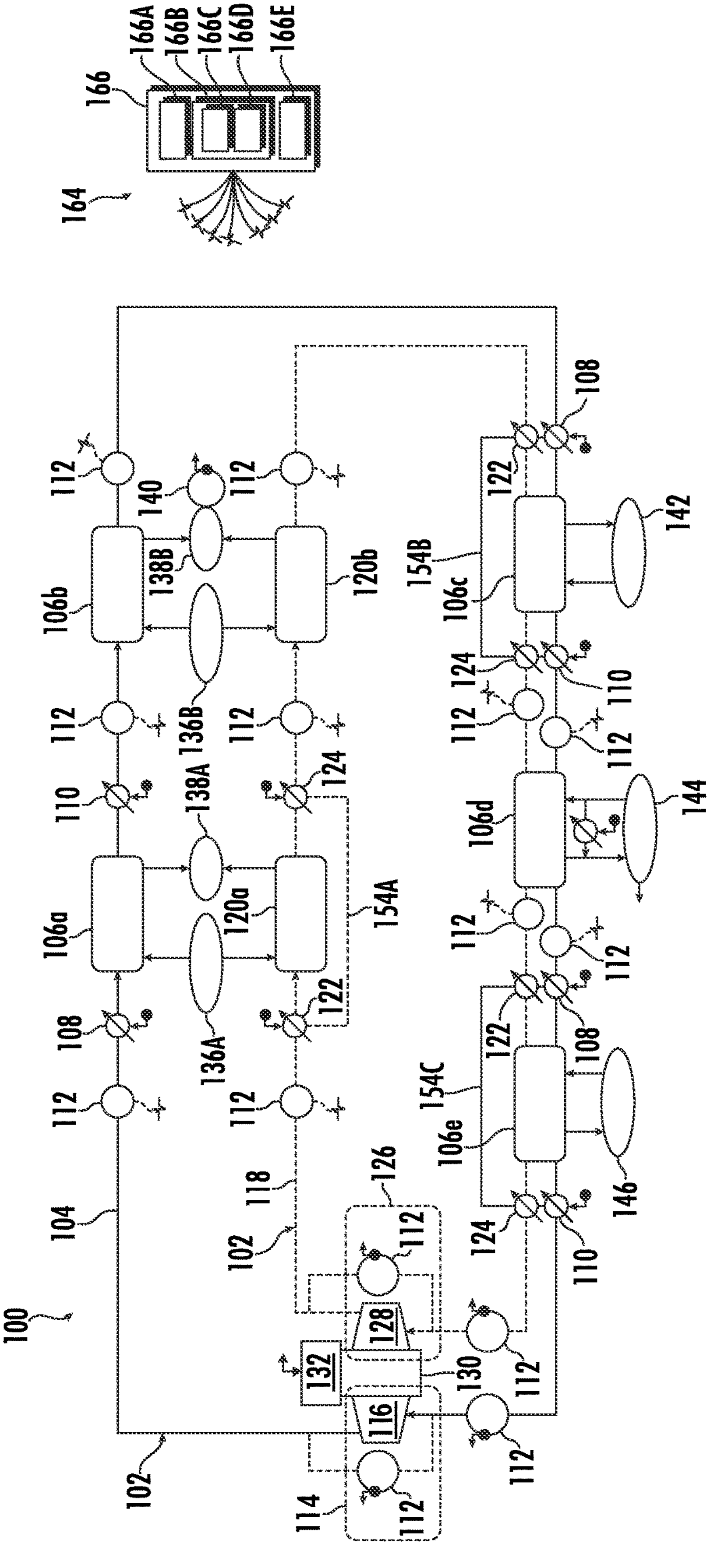
FIG. 2 is a schematic view of a thermal management system in accordance with an exemplary aspect of the present disclosure.

Referring now to FIG. 2, a schematic, flow diagram is provided of a thermal management system 100 in accordance with an exemplary embodiment of the present disclosure for incorporation at least partially into the exemplary turbofan engine 12 of FIG. 1.

As shown, thermal management system 100 generally includes a thermal transport bus 102. Thermal transport bus 102 includes an intermediary heat exchange fluid flowing therethrough and may be formed of one or more suitable fluid conduits. The heat exchange fluid is disposed to flow through thermal transport bus 102. The heat exchange fluid may be an incompressible fluid having a high temperature operating range. For example, in certain embodiments, the heat exchange fluid may be a liquid such as a water and ethanol mixture, or any suitable dielectric fluid. In other embodiments, however, the heat exchange fluid may be any other suitable fluid, such as an oil having a relatively high temperature operating range, a phase change fluid (configured to change between, e.g., liquid and gas phases across the anticipated operating temperature ranges), a supercritical heat exchange fluid (such as a supercritical CO2), etc.

Thermal transport bus 102 also includes a first flow loop 104. First flow loop 104 is a closed loop conduit containing the intermediary heat exchange fluid flowing therethrough. First flow loop 104 includes at least one of first heat exchangers 106*a-e*. First heat exchangers 106*a-e* are devices for transferring thermal energy between two fluids.

In certain exemplary embodiments, first heat exchangers 106*a-b* may be heat source heat exchangers. More specifically, in at least certain exemplary aspects, first heat exchanger 106*a* may be a compressor bleed air heat exchanger and heat exchanger 106*b* may be a compressor discharge pressure heat exchanger. Additionally, or alternatively, in other exemplary embodiments, first heat exchangers 106*c-e* may be heat sink heat exchangers. More specifically, in at least certain exemplary aspects, first heat exchanger 106*c* may be a flowpath stream heat sink heat exchanger, first heat exchanger 106*d* may be a fuel cooled bus cooler heat sink heat exchanger, and first heat exchanger 106*e* may be an air cooled bus cooler.

It will be appreciated, however, that in other exemplary embodiments, any of first heat exchangers 106*a-e* may be configured as a main lubrication system heat exchanger, a cooled cooling air system heat exchanger, an active thermal clearance control system heat exchanger, a generator lubrication system heat exchanger, an environmental control system heat exchanger, an electronics cooling system heat exchanger, an air cooled bus cooler system heat exchanger, a fuel cooled bus cooler system heat exchanger, a compressor discharge pressure system heat exchanger, or a waste heat recovery system heat exchanger.

First flow loop 104 additionally includes upstream valves 108 and downstream valves 110. In certain exemplary embodiments, upstream valves 108 and downstream valves 110 may be variable two-way valves with an inlet and an outlet fluidly connected with thermal transport bus 102. Additionally, or alternatively, in other exemplary embodiments, upstream valves 108 and downstream valves 110 may be three-way heat sink valves with an inlet fluidly connected with thermal transport bus 102, a first outlet fluidly connected with thermal transport bus 102, and a second outlet fluidly connected with a bypass line configured to transport flow of the heat exchange fluid around a given heat exchanger and back into thermal transport bus 102.

First flow loop 104 further includes sensors 112. Sensors 112 are devices configured to detect or measure a property of a medium. In certain exemplary embodiments, sensors 112 can be configured to sense, detect, monitor, or any combination thereof a performance characteristic such as a temperature, a pressure, a density, a flow rate, a flow direction, or other physical (or chemical) properties of the heat exchange fluid in first flow loop 104 and in a second flow loop 118 (described below).

First flow loop 104 also includes a first pump 114 to move the heat exchange fluid through first flow loop 104. First pump 114 is fluidly connected to first flow loop 104 and is disposed to generate a closed-loop flow of the heat exchange fluid in thermal transport bus 102 within first flow loop 104.

First pump 114 includes a first compressor 116. First compressor 116 is a device configured to compress or otherwise generate a flow of the heat exchange fluid in thermal transport bus 102, and in particular in first flow loop 104. First compressor 116 is fluidly connected to and disposed between heat exchanger 106*e* and heat exchanger 106*a*.

Thermal transport bus 102 also includes a second flow loop 118. Similar to first flow loop 104, second flow loop 118 also is a closed loop conduit containing the intermediary heat exchange fluid flowing therethrough.

Second flow loop 118 includes at least one second heat exchanger 120*a-b*. In certain exemplary embodiments, second heat exchangers 120*a-b* may be heat source heat exchangers. More specifically, in at least certain exemplary aspects, second heat exchanger 120*a* may be a compressor bleed air heat exchanger and second heat exchanger 120*b* may be a compressor discharge pressure heat exchanger. Second heat exchanger 120*a* is in fluid communication with and is disposed downstream from a second pump 126 (described below). Second heat exchanger 120*b* is in fluid communication with and is disposed downstream from second heat exchanger 120*a*.

In certain exemplary embodiments, any one or more of heat exchangers 106*a-e* and 120*a-b* may be configured as a heat sink exchanger for transferring heat from the heat exchange fluid in thermal transport bus 102, e.g., to atmosphere, to fuel, to a fan stream, etc. For example, in certain embodiments, a heat sink exchanger (e.g., one or more of heat exchangers 106*a-e* and 120*a-b*) may include at least one of a RAM heat exchanger, a fuel heat exchanger, a fan stream heat exchanger, or a bleed air heat exchanger. The RAM heat exchanger may be configured as an "air to heat exchange fluid" heat exchanger integrated into one or both of turbofan engine 12 or an aircraft including turbofan engine 12. During operation, the RAM heat exchanger may remove heat from any heat exchange fluid therein by flowing a certain amount of RAM air over the RAM heat exchanger. Additionally, the fuel heat exchanger is a "liquid to heat exchange fluid" heat exchanger wherein heat from the heat exchange fluid is transferred to a stream of liquid fuel for turbofan engine 12. Moreover, the fan stream heat exchanger is generally an "air to heat exchange fluid" heat exchanger which flows, e.g., bypass air over heat exchange fluid to remove heat from the heat exchange fluid. Further, the bleed air heat exchanger is generally an "air to heat exchange fluid" heat exchanger which flows, e.g., bleed air from LP compressor 24 over the heat exchange fluid to remove heat from the heat exchange fluid. An engine including one or more of these heat exchangers may include one or more ducts to provide the cooling fluid (e.g., air, fuel, etc.) to and from the heat exchangers, or the heating fluid (e.g., air, oil, etc.) to and from the heat exchangers. As used herein, the term "duct" refers generally to any conduit or enclosure designed for, or capable of, providing a flow of fluid between two locations.

Second flow loop 118 also includes upstream valves 122 and downstream valves 124. Upstream valves 122 and downstream valves 124 are devices for controlling an amount of a fluid therethrough.

In certain exemplary embodiments, upstream valves 122 and downstream valves 124 may be variable two-way valves with an inlet and an outlet fluidly connected with thermal transport bus 102. Additionally, or alternatively, in other exemplary embodiments, upstream valves 122 and downstream valves 124 may be three-way heat sink valves with an inlet fluidly connected with thermal transport bus 102, a first outlet fluidly connected with thermal transport bus 102, and a second outlet fluidly connected with a bypass line configured to transport flow of the heat exchange fluid around a given heat exchanger and back into thermal transport bus 102.

Second flow loop 118 additionally includes second pump 126 to move the heat exchange fluid through second flow loop 118. Second pump 126 is fluidly connected to second flow loop 118 and is disposed to generate a closed-loop flow of the heat exchange fluid in thermal transport bus 102 within second flow loop 118. In certain exemplary embodiments, first pump 114 and second pump 126 may each be a rotary pump including an impeller, or alternatively may be any other suitable fluid pump.

Second pump 126 includes a second compressor 128. Second compressor 128 is a device configured to compress or otherwise generate a flow of the heat exchange fluid in thermal transport bus 102, and in particular in second flow loop 118. Second compressor 128 is fluidly connected to and disposed between heat exchanger heat exchanger 106*e* and heat exchanger 120*a*.

In certain exemplary embodiments, first pump 114 and second pump 126 may be powered by an electric motor, or alternatively may be in mechanical communication with and powered by, e.g., the HP shaft 34 or the LP shaft 36 of turbofan engine 12. More specifically, in at least certain exemplary aspects, thermal management system 100 may include a common drive system 130 to drive first pump 114 and second pump 126. Common drive system 130 can include an inverter 132 for converting electricity from common drive system 130 from DC electric current to AC electric current.

In certain exemplary embodiments, such as depicted in FIG. 2, It will be appreciated that first flow loop 104 and second flow loop 118 of thermal management system 100 provide redundant and isolated heat removal capacity to a plurality of common heat sources 136A-B. More specifically, in at least certain exemplary aspects, heat exchanger 106*a* and heat exchanger 120*a* are configured with a common heat source 136A such that each of heat exchanger 106*a* and heat exchanger 120*a* provide independent and isolated heat removal capability (via the heat exchange fluid) to the same common heat source 136A. Likewise, heat exchanger 106b and heat exchanger 120*b* are configured with a common heat source 136B such that each of heat exchanger 106*b* and heat exchanger 120*b* provide independent and isolated heat removal capability (via the heat exchange fluid) to the same common heat source 136B.

In certain exemplary embodiments, the common heat source 136A and the common heat source 136B may be: a main lubrication system heat exchanger for transferring heat from the main lubrication system 70; a cooled cooling air system heat exchanger for transferring heat from the CCA system 72; an active thermal clearance control system heat exchanger for transferring heat from the ACC system 74; a generator lubrication system heat exchanger for transferring heat from the electric machine thermal system 76; an environmental control system heat exchanger for transferring heat from the ECS 78; an electronics cooling system heat exchanger for transferring heat from the electronics cooling system 80; an air cooled bus cooler system heat exchanger; a fuel cooled bus cooler system heat exchanger; a compressor discharge pressure system heat exchanger; or a waste heat recovery system heat exchanger.

First flow loop 104 is isolated from second flow loop 118 such that the heat exchange fluid moving through the first flow loop 104 does not mix with the heat exchange fluid moving through second flow loop 118. For example, although heat exchanger 106*a* and heat exchanger 120*a* are configured to remove heat from the same common heat source 136A, heat exchangers 106*a* and 120*a* are structurally independent and fluidly isolated such that the heat exchange fluid moving through the respective heat exchangers 106*a* and 120*a* does not mix. Likewise, heat exchangers 106*b* and 120*b* are structurally independent and fluidly isolated such that the heat exchange fluid moving through the respective heat exchangers 106*b* and 120*b* does not mix.

In certain exemplary embodiments, heat exchangers 106*c-e* are in fluid communication with first flow loop 104 and with second flow loop 118. Additionally, or alternatively, in such exemplary embodiments, first flow loop 104 can be out of fluid communication with heat exchangers 120*a* and 120*b*, while second flow loop 118 can be out of fluid communication with heat exchangers 106*a* and 106*b*. It will be appreciated, however, that in other exemplary embodiments, that any of heat exchangers 106*a-e* and 120*a-b* can be in or out of fluid communication with first flow loop 104 and/or second flow loop 118.

Thermal management system 100 additionally includes common cold destinations 138A-b. Common cold destinations 138A-b are locations or portions of propulsion system 10 (FIG. 1) that make use of a cooling air flow to reduce an amount of thermal energy therein. In certain exemplary embodiments, common cold destination 138A may be a cooled cooling air source and common cold destination 138B may be a portion of HP turbine 30 (e.g., a first stage blade of HP turbine 30).

As is depicted, the engine including the thermal management system 100 may include one or more ducts to transport the heating fluid to the heat exchangers 106*a*, 106*b*, 120*a*, 120*b* from the heat sources 136A, 136B and to the cold destinations 138A, 138B from the heat exchangers 106*a*, 106*b*, 120*a*, 120*b*.

Thermal transport bus 102 additionally includes a sensor 140. In this exemplary embodiment, sensor 140 is connected to and is disposed to monitor a temperature, a pressure, a density, a flow rate, a flow direction, another physical (or chemical) property, or any combination thereof of common cold destination 138B or of a fluid flowing therethrough.

In other exemplary embodiments, thermal management system 100 may include one or more sensors 140 disposed to sense, detect, or monitor a temperature, a pressure, a density, a flow rate, a flow direction, another physical (or chemical) property, or any combination thereof of common cold destination 138A, a heat source 142, a cold source 144, a cold source 146, or of a fluid flowing therethrough.

In certain exemplary embodiments, sensors 112 and sensor 140 are configured to transmit a wireless signal to a location in an engine or an aircraft, such as to the cockpit or to a controller 164. As described below, the controller 164 may be an engine controller (such as a Full Authority Digital Engine Control controller) or an aircraft controller.

Heat source 142 is a fluid source with an amount of thermal energy greater than the amount of thermal energy of the heat exchanger fluid flowing through heat exchanger 106*c*. In this exemplary embodiment, heat source 142 is fluidly connected to heat exchanger 106*c*. In certain exemplary embodiments, heat source 142 can be a source of exhaust of the engine.

Cold source 144 and cold source 146 are fluid sources with an amount of thermal energy less than the amount of thermal energy of the heat exchanger fluid flowing through heat exchanger 106*d* and heat exchanger 106*e*, respectively. In certain exemplary embodiments, cold source 144 may be a fuel source of propulsion system 10 (FIG. 1) and cold source 146 may be a working air stream (e.g., third stream flow of air) of propulsion system 10.

Thermal transport bus 102 additionally includes bypass lines 154A-C. In certain exemplary embodiments, bypass lines 154A-C are pipes or conduits configured to transport or divert a flow of the heat exchanger fluid around a component (e.g., any of heat exchangers 106*a-e* and 120*a-b*) along thermal transport bus 102.

Bypass line 154A is fluidly connected to second flow loop 118 at one of upstream valves 122 and at one of downstream valves 124. More specifically, in at least certain exemplary aspects, bypass line 154A is configured to divert a flow of the heat exchange working fluid from second flow loop 118, through bypass line 154A, around heat exchanger 120*a,* and rejoin the flow of the heat exchange fluid back into second flow loop 118.

Bypass line 154B is fluidly connected to first flow loop 104 and to second flow loop 118 at upstream valves 122 (directly upstream from heat exchanger 106*c*) and at downstream valves 124 (directly downstream from heat exchanger 106*c*). More specifically, in at least certain exemplary aspects, bypass line 154B is configured to divert a flow of the heat exchange working fluid from either first flow loop 104 or second flow loop 118, through bypass line 154B, around heat exchanger 106*c,* and rejoin the flow of the heat exchange fluid back into first flow loop 104 or second flow loop 118.

Bypass line 154C is fluidly connected to first flow loop 104 and to second flow loop 118 at upstream valves 122 (directly upstream from heat exchanger 106*e*) and at downstream valves 124 (directly downstream from heat exchanger 106*e*). More specifically, in at least certain exemplary aspects, bypass line 154C is configured to divert a flow of the heat exchange working fluid from either first flow loop 104 or second flow loop 118, through bypass line 154C, around heat exchanger 106*e,* and rejoin the flow of the heat exchange fluid back into first flow loop 104 or second flow loop 118.

As depicted in FIG. 2, it may be desired to configure each of heat exchangers 106*a-e* and 120*a-b* with a respective bypass line 154, upstream valve 108, and downstream valve 110. This provides thermal management system 100 with the capability to isolate one of the heat exchangers configured with each of common heat sources 136A-b in the event of a failure (e.g., leak or rupture). For example, if heat exchanger 106*a* fails or if a component connected to heat exchanger 106*a* fails, heat exchanger 106*a* can be isolated and bypassed within first flow loop 104 leaving heat exchanger 120*a* to provide heat removal capability to the common heat source 136A. Likewise, if heat exchanger 106*c* fails, heat exchanger 106*c* can be isolated and bypassed within second flow loop 118.

Still referring to the embodiment of FIG. 2, the plurality of heat exchangers 106*a-e* in first flow loop 104, and the plurality of heat exchangers 120*a-b* in second flow loop 118, may be configured for selective activation of any combination thereof within their respective flow loop. For this, each of heat exchangers 106*a-e* and 120*a-b* may be provided with a bypass line 154A-C, upstream valve 108, 122, and downstream valve 110, 124. In certain exemplary embodiments, upstream valves 108 may be a three-way heat sink valve with an inlet fluidly connected with thermal transport bus 102, a first outlet fluidly connected with thermal transport bus 102, and a second outlet fluidly connected with bypass line 154. Upstream valve 108 may each be a variable throughput three-way valve, such that upstream valve 108 may vary a throughput from the inlet to the first and/or second outlets. For example, upstream valve 108 may be configured for providing anywhere between zero percent (0%) and one hundred percent (100%) of the heat exchange fluid from the inlet to the first outlet, and similarly, upstream valve 108 may be configured for providing anywhere between zero percent (0%) and one hundred percent (100%) of the heat exchange fluid from the inlet to the second outlet.

In certain exemplary embodiments, the various valves, such as upstream valves 108, downstream valves 110, upstream valves 122, and downstream valves 124, may be selectively controlled to vary the throughput through the respective valves 108, 110, 122, and 124 of the heat exchange fluid. More specifically, in at least certain exemplary aspects, thermal management system 100 includes controller 164, such as an engine controller for propulsion system 10 (FIG. 1) (e.g., a Full Authority Digital Engine Control (FADEC) controller), an aircraft controller, a controller dedicated to thermal management system 100, etc., to facilitate modulation of the respective valves 108, 110, 122, and 124.

Thermal management system 100 further includes controller 164. In certain exemplary embodiments, controller 164 may be configured to receive data indicative of various operating conditions and parameters of thermal management system 100 (and of propulsion system 10) during operation of turbofan engine 12. For example, in addition to sensors 112 and sensor 140 of thermal management system 100, propulsion system 10 (FIG. 1) may include one or more sensors configured to sense data indicative of various operating conditions and parameters of turbofan engine 12 (FIG. 1), such as throttle setting, temperatures, pressures, etc.

Referring particularly to the operation of controller 164, in at least certain embodiments, controller 164 can include one or more computing device(s) 166. The computing device(s) 166 can include one or more processor(s) 166A and one or more memory device(s) 166B. The one or more processor(s) 166A can include any suitable processing device, such as a microprocessor, microcontroller, integrated circuit, logic device, and/or other suitable processing device. The one or more memory device(s) 166B can include one or more computer-readable media, including, but not limited to, non-transitory computer-readable media, RAM, ROM, hard drives, flash drives, and/or other memory devices.

The one or more memory device(s) 166B can store information accessible by the one or more processor(s) 166A, including computer-readable instructions 166C that can be executed by the one or more processor(s) 166A. The instructions 166C can be any set of instructions that when executed by the one or more processor(s) 166A, cause the one or more processor(s) 166A to perform operations. In some embodiments, the instructions 166C can be executed by the one or more processor(s) 166A to cause the one or more processor(s) 166A to perform operations, such as any of the operations and functions for which controller 164 and/or the computing device(s) 166 are configured, the operations for modulating a valve as described herein, and/or any other operations or functions of the one or more computing device(s) 166. The instructions 166C can be software written in any suitable programming language or can be implemented in hardware. Additionally, and/or alternatively, the instructions 166C can be executed in logically and/or virtually separate threads on processor(s) 166A. The memory device(s) 166B can further store data 166D that can be accessed by the processor(s) 166A. For example, the data 166D can include data indicative of power flows, data indicative of turbofan engine 12 (FIG. 1) aircraft operating conditions, and/or any other data and/or information described herein.

The computing device(s) 166 can also include a network interface 166E used to communicate, for example, with the other components of propulsion system 10, the aircraft incorporating propulsion system 10, thermal management system 100, etc. For example, in the embodiment depicted, controller 164 is operably coupled to valves 108, 110, 122, and 124 (as well as, e.g., one or more sensors for sensing data indicative of one or more parameters of propulsion system 10 (FIG. 1) and/or various accessory systems) through, e.g., the network interface 166E, such that controller 164 may receive data indicative of various operating parameters sensed by the one or more sensors during operation, various operating conditions of the components, etc., and further may provide commands to control flow of the heat exchange fluid and other operating parameters of these systems, e.g., in response to the data sensed by the one or more sensors and other conditions.

The network interface 166E can include any suitable components for interfacing with one or more network(s), including for example, transmitters, receivers, ports, controllers, antennas, and/or other suitable components. In certain exemplary embodiments, in the embodiment shown, the network interface 166E is configured as a wireless communication network wirelessly in communication with these components (as is indicated by the dashed communication lines in FIGS. 3A and 3B).

The technology discussed herein refers to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. In certain exemplary embodiments, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that although the exemplary embodiment depicted in FIG. 2 includes upstream valves 108 and downstream valves 110 for bypassing the respective heat exchanger 106*a-e* and upstream valves 122 and downstream valves 124 for bypassing the respective heat exchanger 120*a-b*, in other embodiments the gas turbine engine and/or thermal management system 100 may have any other suitable configuration for bypassing one or more of these heat exchangers.

In certain exemplary embodiments, the heat source and/or heat sink system may be configured to bypass the heat exchangers of the thermal management system. More specifically, in at least certain exemplary aspects, when fuel is the heat sink thermally coupled to one of heat exchangers 106*a-e*, the fuel may be bypassed around the respective heat exchangers 106*a-e* with which it is otherwise fluidly coupled. Similarly for example, when a lubrication oil system is a heat source thermally coupled to one of heat exchangers 106*a-e*, the lubrication oil may be bypassed around the respective heat exchangers 106*a-e* with which it is otherwise fluidly coupled. In such a manner, it may be possible to adjust heat source systems and/or heat sink systems of the aircraft engine in response to a leak or failure or a component, while still allowing for desired operations of thermal management system 100. For example, it may be possible to shut down a bleed port flow (which may be a heat sink system with respect to thermal management system 100) and de-rate turbofan engine 12 (FIG. 1) in the event of a malfunctioning heat source pipe. Such may provide for a simpler approach to bypassing heat exchangers when it is determined to be necessary or desirable.

Notably, upstream valve 108 may be in operable communication with controller 164 of turbofan engine 12 (FIG. 1) and/or of an aircraft including turbofan engine 12. Controller 164 may bypass one or more of heat exchangers 106*a-e* in first flow loop 104 and the heat exchangers 120*a-b* in second flow loop 118 based on, e.g., a change (e.g., a gradual or sudden change) in an operating condition of turbofan engine 12 and/or aircraft, a temperature or pressure of the heat exchange fluid of thermal management system 100, and/or any other suitable variables.

In certain exemplary embodiments, a method of detecting an airflow fault condition in turbofan engine 12 (FIG. 1) is provided. More particularly, referring now to FIG. 3, a flow diagram of a method of detecting an airflow fault condition in a gas turbine engine is provided at method 170. Method 170 may be used with the turbofan engine 12 and the thermal management system described above, or with any other suitable gas turbine engine and thermal management system.

Method 170 includes at 172 operating the gas turbine engine (e.g., the turbofan engine 12 of FIG. 1) with a thermal transport bus (such as thermal transport bus 102) having an intermediary heat exchange fluid flowing therethrough. Operating the gas turbine engine at 172 includes, for the exemplary aspect depicted, at 174 providing the intermediary heat exchange fluid to a heat exchanger of the thermal transport bus, and at 176 providing a fluid flow through a duct of the gas turbine engine to the heat exchanger to exchange heat with the intermediary heat exchange fluid. For example, providing the intermediary heat exchange fluid to a heat exchanger of the thermal transport bus may include, e.g., providing the heat exchange fluid to one of heat exchangers 106*a-e* (see FIG. 2), and providing the fluid flow through the duct of the gas turbine engine to the heat exchanger may include, e.g., providing a fluid flow from one or more of heat sources or cold sources 136A-b, 142, 144, 146.

The exemplary method 170 depicted further includes at 178 monitoring a performance characteristic of the intermediary heat exchange fluid in thermal transport bus; and at 180 determining the performance characteristic of the intermediary heat exchange fluid in the thermal transport bus is outside of a predetermined range. The performance characteristic can include a temperature, a pressure, a flowrate, or a combination thereof of the intermediary heat exchange fluid. In certain exemplary embodiments, the performance characteristic may be an absolute temperature, pressure, and/or flowrate (e.g., the characteristic at a single location), or may be a differential temperature, pressure, and/or flowrate (e.g., a difference in the characteristic between two locations). The differential measurements may be across, e.g., a heat exchanger, or alternatively may be a differential measurement from a location on or within the thermal transport bus 102 to another engine location, such as a flowpath characteristic of the engine, such as a turbine inlet temperature or pressure, a compressor exit temperature or pressure, etc.

Monitoring the performance characteristic of the intermediary heat exchange fluid at 178 can include sensing data indicative of the performance characteristic of the intermediary heat exchange fluid with sensor 112 (FIG. 2). For example, in certain exemplary aspects, monitoring the performance characteristic of the intermediary heat exchange fluid at 178 can include measuring the performance characteristic with one or more of sensors 112 (e.g., with a temperature sensor, a pressure sensor, or both of a temperature sensor and a pressure sensor).

Figure 3:
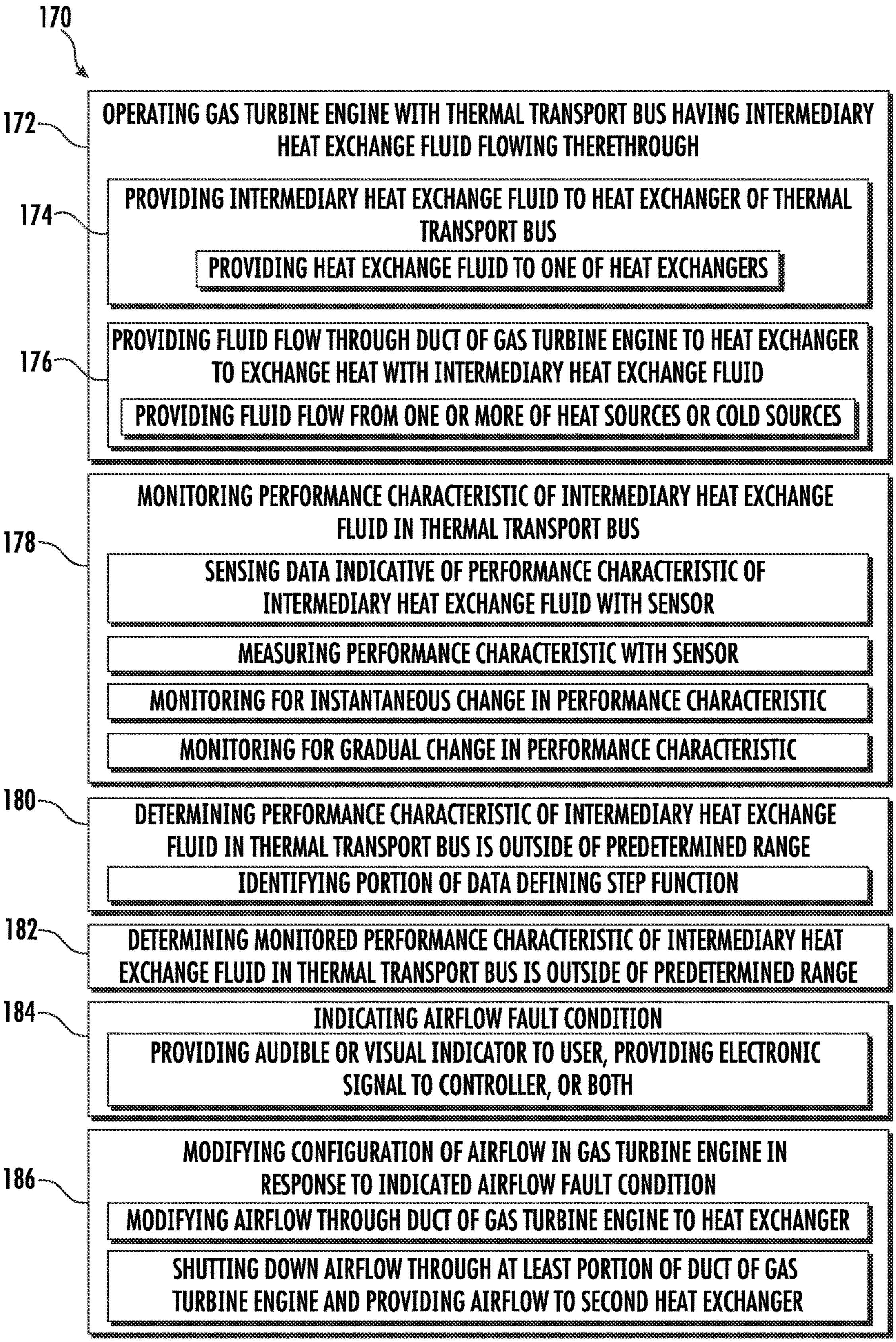
FIG. 3 is a flowchart of a method of detecting an airflow fault condition of a gas turbine engine in accordance with an exemplary aspect of the present disclosure.

Referring still to the exemplary aspect of method 170 depicted in FIG. 3, monitoring the performance characteristic of the intermediary heat exchange fluid at 178 can additionally, or alternatively, include monitoring for an instantaneous change in the performance characteristic. The instantaneous change in the performance characteristic can be defined by when the performance characteristic changes at a rate of 20% or more of a normal operating value of the performance characteristic per 30 seconds. The instantaneous change in the performance characteristic can additionally, or alternatively, be defined by a step function of the performance characteristic. As used herein, the term "step function" refers to a series of intervals each with a substantially constant value that is different than a previous or following interval. A data set can be created that is representative of the monitored performance characteristic of the intermediary heat exchange fluid. In such an embodiment, determining the performance characteristic is outside of the predetermined range at 180 can additionally, or alternatively, include identifying a portion of the data defining a step function. Furthermore, it will be appreciated that with such an exemplary aspect, sensing the performance characteristic of the intermediary heat exchange fluid can include sensing a piecewise change in the performance characteristic of the intermediary heat exchange fluid. As used herein, the term "piecewise change" refers to a function defined by multiple different intervals of with each interval including changing values.

Moreover, monitoring the performance characteristic of the intermediary heat exchange fluid at 178 can additionally, or alternatively, include monitoring for a gradual change in the performance characteristic. The gradual change in the performance characteristic can be defined by when the performance characteristic changes at a rate of 20% or less of a normal operating value of the performance characteristic per 30 seconds.

As noted above, the exemplary method depicted further includes determining the performance characteristic of the intermediary heat exchange fluid in the thermal transport bus is outside of the predetermined range. More specifically, for the exemplary aspect depicted, method 170 includes at 182 determining the monitored performance characteristic of the intermediary heat exchange fluid in the thermal transport bus is outside of the predetermined range.

In response to determining the monitored performance characteristic is outside of the predetermined range at 182, method 170 includes at 184 indicating an airflow fault condition. In at least certain exemplary aspects, indicating the airflow fault condition at 184 may include providing an audible or visual indicator to a user, providing an electronic signal to a controller, or both.

Moreover, in certain exemplary aspects, the airflow fault condition can be a broken pipe of turbofan engine 12 (FIG. 1). For example, the airflow fault condition may refer a fault external to thermal transport bus 102, such as a leak, rupture, or the like in the duct of turbofan engine 12 providing the fluid flow to the heat exchanger of thermal management system 100 (FIG. 2) to exchange heat with the intermediary heat exchange fluid of thermal management system 100. In such a manner, it will be appreciated that when, e.g., a cooling airflow is being provided to a heat sink heat exchanger of thermal transport bus 102 (FIG. 2), if there is a fault in the duct providing the cooling airflow to the heat sink heat exchanger of thermal transport bus 102, a performance characteristic of the intermediary heat exchange fluid through thermal transport bus 102 will be affected. If the fault is a large leak or rupture, the change in the performance characteristic may be relatively drastic (e.g., an instantaneous change). If the fault is a small leak or rupture, the change in the performance characteristic may be less drastic (e.g., a gradual change).

Referring still to FIG. 3, method 170 further includes at 186 modifying a configuration of airflow in gas turbine engine in response to the indicated airflow fault condition. In at least certain exemplary aspects, modifying the configuration of airflow in the gas turbine engine at 186 may include modifying the airflow through the duct of the gas turbine engine to the heat exchanger. For example, in certain exemplary aspects, the heat exchanger may be a first heat exchanger, and modifying the configuration of airflow in the gas turbine engine at 186 may include shutting down an airflow through at least a portion of the duct of the gas turbine engine and providing an airflow to a second heat exchanger. The airflow provided may include at least a portion of the airflow previously provided through the duct, and the second heat exchanger may be a redundant heat exchanger to the first heat exchanger.

Additionally, modifying the configuration of airflow in the gas turbine engine can include selectively deactivating fluid communication of heat exchanger (e.g., first heat exchanger) with thermal transport bus, and more specifically can include selectively bypassing the heat exchanger by sending a flow of heat exchanger fluid through the thermal transport bus through a bypass line to the second heat exchanger that is in fluid communication with thermal transport bus.

For example, referring briefly back to the embodiment of FIG. 2, in the embodiment shown, modifying the configuration of airflow in turbofan engine 12 (FIG. 1) can include modifying a configuration of thermal transport bus 102 by varying a position (e.g., opening, closing, partially opening, partially closing, etc.) of one or more of upstream valves 108, downstream valves 110, upstream valves 122, and downstream valves 124 valve that are in fluid communication with thermal transport bus 102. Modifying the configuration of airflow in turbofan engine 12 can additionally, or alternatively, include modifying a configuration of a secondary circuit of turbofan engine 12 by varying a position of a valve in fluid communication with the secondary circuit. In certain exemplary embodiments, a secondary circuit of turbofan engine 12 can include a circuit not directly connected to either of first flow loop 104 or second flow loop 118. More specifically, in at least certain exemplary aspects, a secondary circuit may include a compressor bleed air circuit, a cooling air circuit for HP turbine 30, an amount of air dumped into ambient or into the exhaust stream or combustion gases 66, etc.

Thermal management system 100 may more efficiently remove heat from the various accessory systems of turbofan engine 12 (FIG. 1) and/or the aircraft during an occurrence of a fault condition such as a leak or a pipe failure. Due to the redundant and selective configuration of the various heat exchangers 106*a-e* and 120*a-b* for the embodiment depicted, utilization of a certain fuel heat exchanger may be ceased if a leak occurs.

For example, when a fault or pipe failure occurs in a component connected to a specific heat exchanger (e.g., heat exchangers 106*a-e* or heat exchangers 120*a-b*) of thermal transport bus 102, that specific heat exchanger can be bypassed in order to utilize, for thermal energy transfer, the remaining heat exchangers that are not in communication with the broken or failed pipe. In this way, the effectiveness of thermal heat transfer of thermal transport bus 102 can be improved in comparison to a failure mode where thermal energy management is less efficient due to a leak caused by the broken or failed pipe.

Benefits of the disclosed method include improved reliability of thermal management system 100 (FIG. 2), a reduced need for bleed air, a reduced weight of propulsion system 10 (FIG. 1), and improved fuel burn by propulsion system 10.

Figure 4:
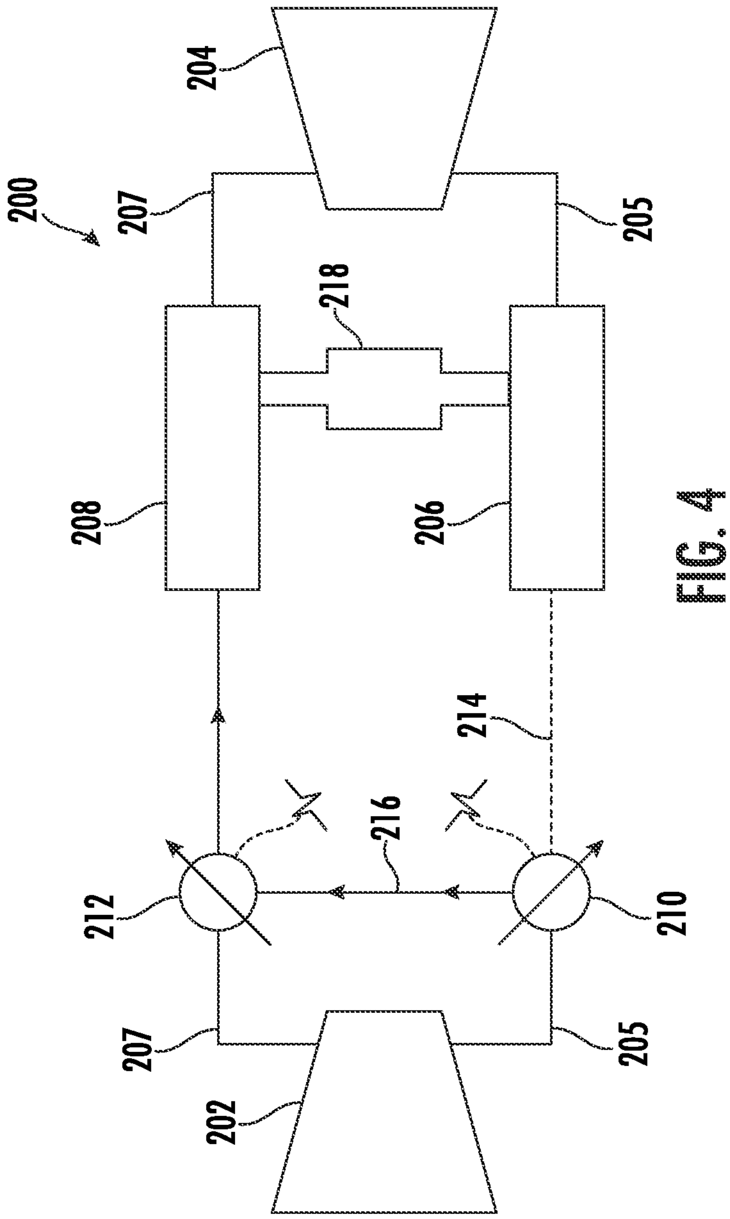
FIG. 4 is a simplified schematic view of a heat exchanger assembly positioned between a compressor section and a turbine section in accordance with an exemplary aspect of the present disclosure.

Referring now to FIG. 4, FIG. 4 is a simplified schematic view of a heat exchanger assembly 200 positioned between a compressor section 202 and a turbine section 204 in accordance with an exemplary aspect of the present disclosure.

In certain exemplary embodiments, compressor section 202 and turbine section 204 may correspond to and be configured in substantially the same manner as the compressor section (e.g., LP compressor 24 and HP compressor 26) and the turbine section (e.g., HP turbine 30 and LP turbine 32) discussed with respect to FIG. 1 above.

Heat exchanger assembly 200 includes a first heat exchanger 206 and a second heat exchanger 208. First heat exchanger 206 and second heat exchanger 208 may be configured in substantially the same manner as described with respect to any of heat exchangers 106*a-e* and 120*a-b*, respectively, in regard to FIG. 2. Here, first heat exchanger 206 is directly connected to turbine section 204 and to compressor section 202 via a first duct 205 and a first valve 210 positioned in airflow communication with first duct 205. Likewise, second heat exchanger 208 is directly fluidly connected to turbine section 204 and to compressor section 202 via a second duct 207 and a second valve 212 positioned in airflow communication with second duct 207. Additionally, first valve 210 is in fluid communication with second valve 212 via a bypass line 216.

First valve 210 and second valve 212 are capable of occupying a fully open position, a fully closed position, or a position between fully open and fully closed. As used herein with respect to FIG. 3, the term "fully closed" can mean that the normal fluid pathway to first heat exchanger 206 via first duct 205 is closed while the fluid pathway from first valve 210 to bypass line 216 is open. In this way, a fluid passing through heat exchanger assembly 200 can be redirected by one of first valve 210 and/or second valve 212 through bypass line 216 to a different part of heat exchanger assembly 200.

For example, in this exemplary embodiment, first valve 210 is shown in a fully closed position. With first valve 210 in a fully closed position, the fluid flow path passing through first valve 210 and through first duct 205 becomes closed and the fluid flow through first valve 210 is redirected to bypass line 216. The redirected flow of fluid from first valve 210 passes through bypass line 216, through (open) second valve 212, and onward to second heat exchanger 208 through second duct 207.

During operation, an open or closed position of first valve 210 (or second valve 212) can be adjusted in response to a signal from a controller (e.g., controller 164 discussed with respect to FIG. 2). The signal from the controller to open or close first valve 210 can be sent by the controller in response to an indication of an airflow fault condition (such as a failed air pipe), which may in turn be in response to determining a performance characteristic of an intermediary heat exchange fluid through the first heat exchanger 206 is above a predetermined threshold. For example, the signal may be in response to an indication of a step change (e.g., in pressure or temperature) or an unexpected thermal performance of heat exchanger assembly 200 or of another component or system connected to a component of heat exchanger assembly 200. For example, first heat exchanger 206 and second heat exchanger 208 may be connected to a thermal transport bus 218 of an aircraft (see e.g., thermal transport bus 102 described with respect to FIG. 2). In certain exemplary embodiments, thermal transport bus 218 may be configured in substantially the same manner as thermal transport bus 102 discussed with respect to FIG. 2.

For example, the first heat exchanger 206 may be a heat source heat exchanger, such as a CCA heat exchanger. In such a manner, the embodiment of FIG. 3 may be configured to bleed compressed air from the compressor through first and second ducts 205, 207. The compressed air may be provided through first and second ducts 205, 207 to the first and second heat exchangers 206, 208, whereby the compressed air is cooled by respective intermediary heat exchange fluids. The cooled air may then be provided to the turbine section 204 to cool one or more components of the turbine section. In response to determining a performance characteristic of the intermediary heat exchange fluid through the first heat exchanger 206 is above the predetermined threshold, the system may determine there is an airflow fault condition in the first duct, and in response redirect an airflow through the first duct to the second duct using valves 210, 212. Optionally, the intermediary heat exchange fluid through the first heat exchanger 206 may also be redirected around the first heat exchanger 206.

In this way, heat exchanger assembly 200 may be reconfigured in response to a sensed or detected failure (e.g., a leak or broken pipe). As such, heat exchanger assembly 200 (and thermal management system 100 of FIG. 2) may provide health monitoring to monitor for a failed air pipe due to a sensed step change or unexpected performance value of a performance parameter/characteristic (e.g., a pressure, a temperature, or other performance characteristic of a working fluid or of a component connected to heat exchanger assembly 200 (or connected to thermal management system 100)).

It will be appreciated that although in the exemplary embodiment depicted in FIGS. 2 through 4 generally discuss use of a thermal transport bus having a plurality of heat exchangers adding heat to an intermediary heat exchange fluid and extracting heat from the intermediary heat exchange fluid to manage thermal loads within an engine, other configurations are contemplated as well. For example, in other exemplary embodiments, the thermal transport bus may be a closed loop system having a relatively small sensing line flowing an intermediary heat exchange fluid. With such a configuration, the sensing line may still accept heat from one or more locations (e.g., via heat exchangers) and may further still reject heat to one or more other locations (e.g., via heat exchangers), however such an operation may have the primary goal of sensing a fault condition instead of managing thermal loads within the engine.

Figure 5:
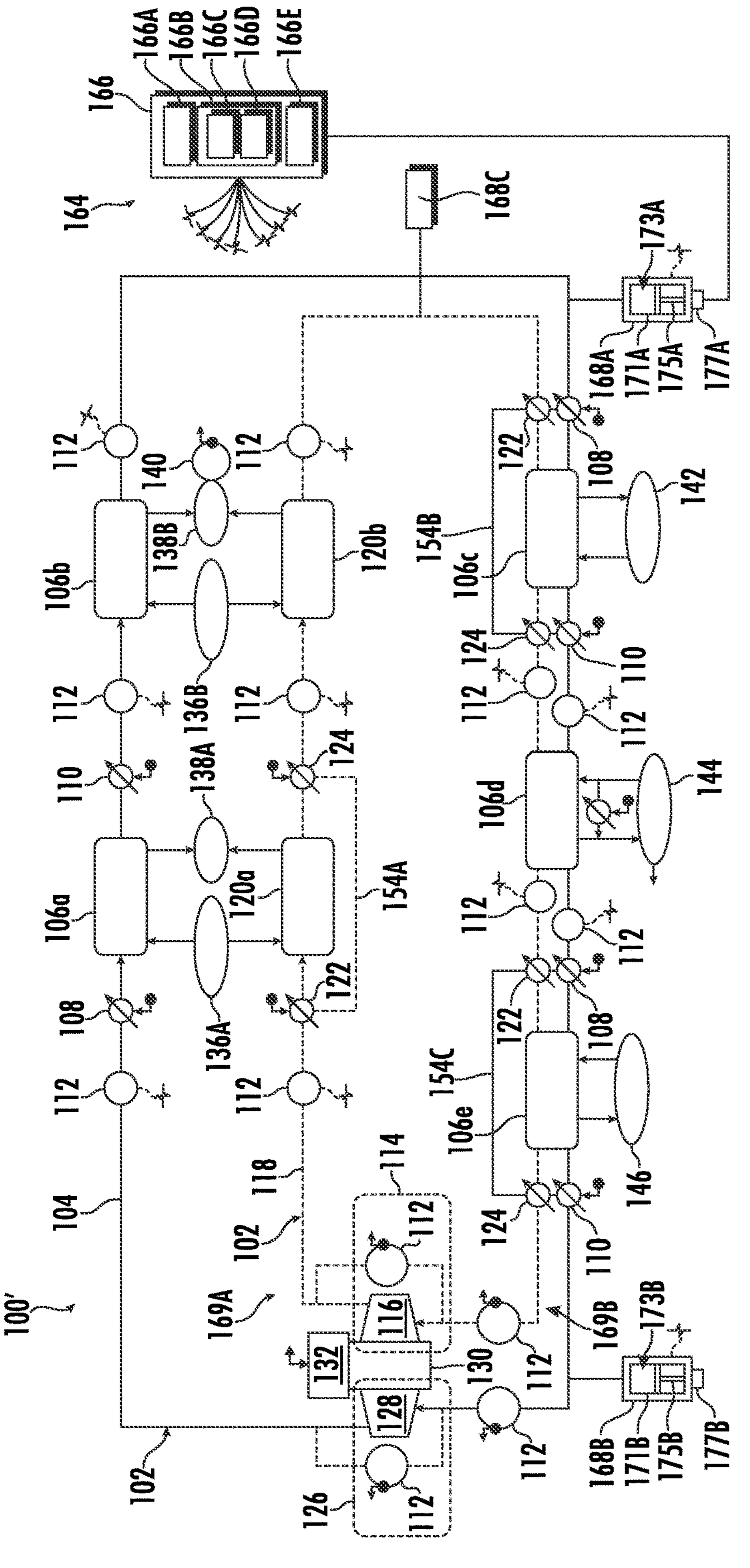
FIG. 5 is a schematic view of another thermal management system in accordance with an exemplary aspect of the present disclosure.

FIG. 5 is a schematic view of a thermal management system 100' in accordance with an exemplary aspect of the present disclosure. The embodiment provided in FIG. 5 may be configured in substantially the same manner as described in regard to FIG. 2, with the addition of a first variable volume device 168A and a second variable volume device 168B.

A thermal management system for turbofan engine 12 (FIG. 1) includes thermal transport bus 102, a control system engaged with thermal transport bus 102, and a variable volume device (or more specifically for the embodiment depicted, first variable volume device 168A and second variable volume device 168B).

Thermal transport bus 102 includes first flow loop 104, heat exchanger 106*c*, second flow loop 118, and an intermediary heat exchange fluid flowing through thermal transport bus 102. First flow loop 104 is fluidly isolated from second flow loop 118. In this exemplary embodiment, heat exchanger 106*c* is disposed along and in fluid communication with first flow loop 104. It will be appreciated, however, that in other exemplary embodiments, heat exchangers 106*d-e* may also be disposed along and in fluid communication with first flow loop 104. Thermal transport bus 102 also includes heat exchanger 106*c* disposed along and in fluid communication with second flow loop 118.

In certain exemplary embodiments, the pressure in first flow loop 104, in second flow loop 118, or in both first flow loop 104 and second flow loop 118 can be pressurized by a fueldraulic actuator and/or by a pressure of a general fuel system, either of which may be fluidly connected to first flow loop 104, to second flow loop 118, or to both first flow loop 104 and second flow loop 118.

The control system is engaged with thermal transport bus 102 and includes sensors 112 and controller 164. Sensors 112 are operably coupled to thermal transport bus 102 and are configured to measure a temperature, a pressure, a flowrate, or a combination thereof of the intermediary heat exchange fluid. Controller 164 is connected (e.g., via a wired and/or wireless connection) to and is configured to receive electrical signals from sensors 112.

First variable volume device 168A and second variable volume device 168B are devices configured to increase or decrease a volume therein. In certain exemplary embodiments, first variable volume device 168A and/or second variable volume device 168B may include an accumulator, an actuator, a bellows, a hydraulic cylinder, a spring-loaded element, a thermal actuated element, or any combination thereof. First variable volume device 168A and second variable volume device 168B are in fluid communication with thermal transport bus 102.

More specifically, in at least certain exemplary aspects, first variable volume device 168A may include a first housing 171A defining a first internal chamber 173A, a first piston 175A disposed within first housing 171A and further defining first internal chamber 173A, and a first actuator 177A disposed to move first piston 175A relative to first housing 171A. First internal chamber 173A is in fluid communication with thermal transport bus 102. In an exemplary embodiment, first variable volume device 168A may be configured to adjust the flow volume of thermal transport bus 102 by 2% to 20% of an initial flow volume of thermal transport bus 102. In another exemplary embodiment, first variable volume device 168A may be configured to adjust the flow volume of first flow loop 104 by 2% to 20% of an initial flow volume of first flow loop 104.

Likewise, in at least certain exemplary aspects, second variable volume device 168B may include a second housing 171B defining a second internal chamber 173B, a second piston 175B disposed within second housing 171B and further defining the second internal chamber 173B, and a second actuator 177B disposed to move second piston 175B relative to second housing 171B. Second internal chamber 173B is in fluid communication with thermal transport bus 102. In an exemplary embodiment, second variable volume device 168B may be configured to adjust the flow volume of thermal transport bus 102 by 2% to 20% of an initial flow volume of thermal transport bus 102 (e.g., a minimum flow volume of the thermal transport bus 102). In another exemplary embodiment, second variable volume device 168B may be configured to adjust the flow volume of first flow loop 104 by 2% to 20% of an initial flow volume of first flow loop 104 (e.g., a minimum flow volume of the first flow loop 104).

First variable volume device 168A and second variable volume device 168B are configured to regulate a pressure of the intermediary heat exchange fluid disposed in first flow loop 104 of thermal transport bus 102.

First variable volume device 168A and second variable volume device 168B are disposed to adjust a pressure of the intermediary heat exchange fluid within thermal transport bus 102. In certain exemplary embodiments, first variable volume device 168A and second variable volume device 168B may be configured to adjust the volume of their respective internal chambers (e.g., first internal chamber 173A and second internal chamber 173B) in response to a change in pressure of the intermediary heat exchange fluid. It will be appreciated, however, that in other exemplary embodiments, first variable volume device 168A and second variable volume device 168B may be configured to adjust the volume of the internal chamber in response to a signal from controller 164.

In certain exemplary embodiments, first variable volume device 168A and second variable volume device 168B is electrically connected to controller 164. Additionally, or alternatively, first variable volume device 168A and second variable volume device 168B may be in wireless communication with controller 164.

Furthermore, referring still to FIG. 5, it will be appreciated that in certain exemplary embodiments, such as the exemplary embodiment depicted, the thermal management system 100' may additionally or alternatively include variable volume devices at other locations. For example, in the embodiment depicted, the thermal management system 100' further includes a third variable volume device 168C in fluid communication with the second flow loop 118 of the thermal transport bus 102. In the embodiment depicted, the third variable volume device 168C is located fluidly between first heat exchanger 106*c* and second heat exchanger 120*b*. The third variable volume device 168C may be configured in a similar manner as first variable volume device 168A.

However, in alternative embodiments, the thermal management system 100' additionally or alternative includes additional or alternative variable volume device(s) at a location 169A or at a location 169B.

A thermal management system in accordance with an exemplary embodiment present in this disclosure provides a way of controlling, actively or passively, the volume on the intermediary working fluid inside of thermal transport bus 102 in response to a pressure (or change therein) associated with either first flow loop 104 or second flow loop 118 depending upon an operating condition of turbofan engine 12 (see e.g., FIG. 1).

It will be appreciated that the exemplary thermal management system 100' depicted in FIG. 5 and described above is provided by way of example only. In other exemplary embodiments, the thermal management system 100' may include any other suitable number and/or configuration of variable volume device(s) 168. For example, in certain exemplary embodiments, the thermal management system 100' may include a single variable volume device 168 fluidly coupled to the first flow loop 104. Additionally, or alternatively, the thermal management system 100' may include more than two variable volume devices 168 fluidly coupled to the first flow loop 104, may include one or more variable volume device(s) 168 fluidly coupled to the second flow loop 118, etc. Moreover, in certain exemplary embodiments, the exemplary thermal management system 100' may not include variable volume device(s) 168.

Figure 6:
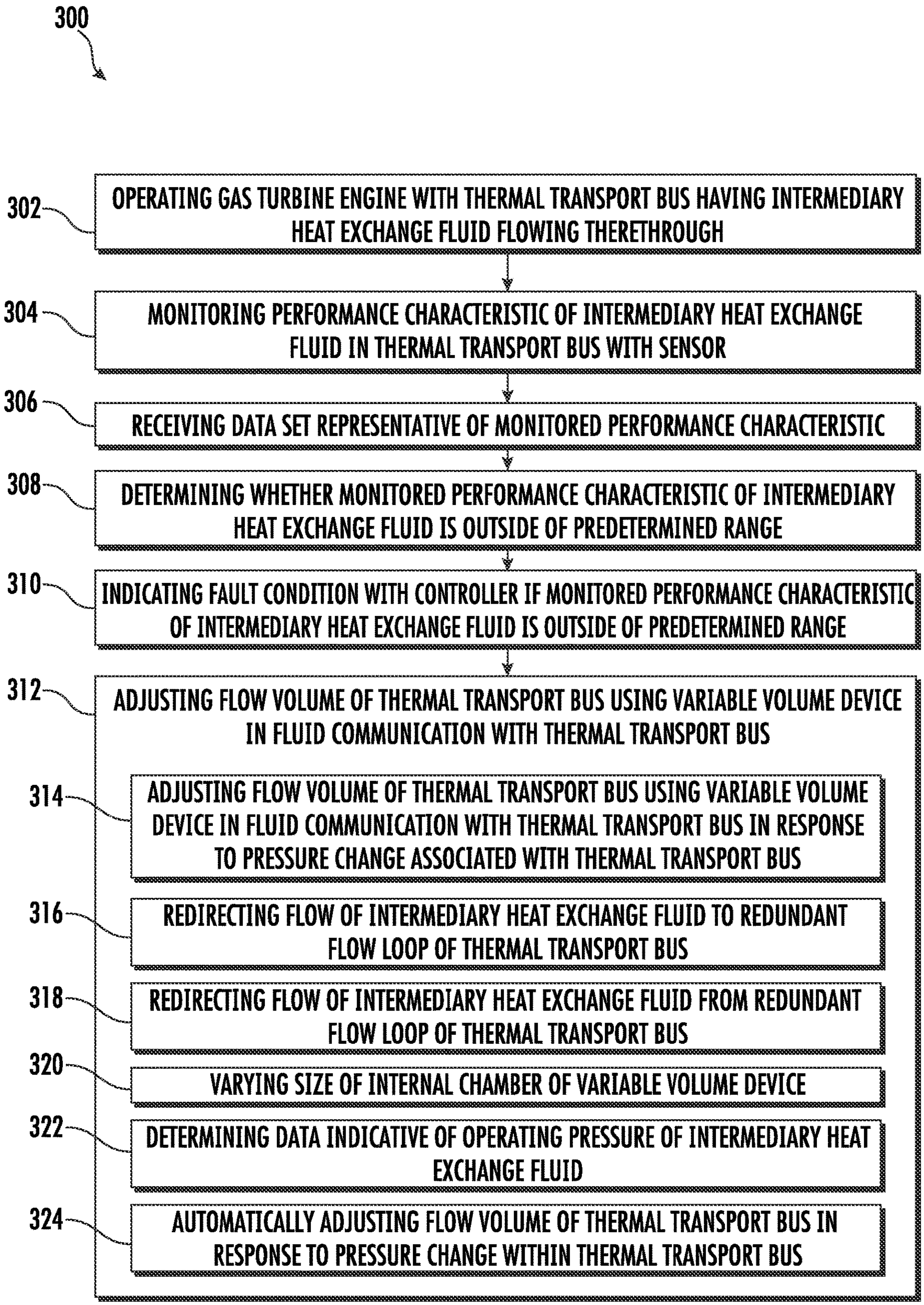
FIG. 6 is a flowchart of a method of regulating pressure in a thermal transport bus of a gas turbine engine in accordance with an exemplary aspect of the present disclosure.

FIG. 6 is a flowchart of a method 300 of regulating pressure in a thermal transport bus (e.g., thermal transport bus 102 of either thermal management system 100 or thermal management system 100') of turbofan engine 12 (FIG. 1) in accordance with an exemplary aspect of the present disclosure. Method 300 of regulating pressure in a thermal transport bus of a gas turbine engine includes steps 302 through 324.

Method 300 includes at 302 operating turbofan engine 12 (FIG. 1) with thermal transport bus 102 having an intermediary heat exchange fluid flowing therethrough, thermal transport bus 102 including one or more heat source heat exchangers and one or more heat sink heat exchangers (e.g., heat exchangers 106*a-e* and heat exchangers 120*a-b*, respectively) in thermal communication with the intermediary heat exchanger fluid.

Method 300 includes at 304 monitoring a performance characteristic of the intermediary heat exchange fluid in thermal transport bus 102 with sensors 112. In certain exemplary embodiments, the performance characteristic may include a temperature, a pressure, a flowrate, or a combination thereof of the intermediary heat exchange fluid.

Method 300 includes at 306 receiving a data set representative of the monitored performance characteristic.

Method 300 includes at 308 determining, from the data set, whether the monitored performance characteristic of the intermediary heat exchange fluid is outside of a predetermined range.

Method 300 includes at 310 indicating a fault condition with controller 164 if the monitored performance characteristic of the intermediary heat exchange fluid is outside of the predetermined range. For example, determining, from the data set, whether the monitored performance characteristic of the intermediary heat exchange fluid is outside of the predetermined range at 308 may include determining, from the data set, that the monitored performance characteristic of the intermediary heat exchange fluid is outside of the predetermined range. In such a case, indicating the fault condition with controller at 310 may include indicating the fault condition in response to determining the monitored performance characteristic of the intermediary heat exchange fluid is outside of the predetermined range.

Method 300 includes at 312 adjusting a flow volume of thermal transport bus 102 using first variable volume device 168A, second variable volume device 168B or both that are in fluid communication with thermal transport bus 102. In certain exemplary embodiments, adjusting the flow volume of thermal transport bus 102 is in response to the indicated fault condition.

Method 300 may also include at 312 step 314 of adjusting the flow volume of thermal transport bus 102 using first variable volume device 168A, second variable volume device 168B or both that are in fluid communication with thermal transport bus 102 in response to a pressure change associated with thermal transport bus 102.

Method 300 may also include at 312 step 316 of redirecting a flow of the intermediary heat exchange fluid to a redundant flow loop (e.g., from first flow loop 104 to second flow loop 118) of thermal transport bus 102. In an exemplary embodiment, adjusting the flow volume of thermal transport bus 102 is in response to redirecting the intermediary heat exchange fluid to the redundant flow loop (e.g., from first flow loop 104 to second flow loop 118).

Method 300 may also include at 312 step 318 of redirecting a flow of the intermediary heat exchange fluid from a redundant flow loop (e.g., to first flow loop 104 from second flow loop 118) of thermal transport bus 102. In another exemplary embodiment, adjusting the flow volume of thermal transport bus 102 is in response to redirecting the intermediary heat exchange fluid from the redundant flow loop (e.g., to first flow loop 104 from second flow loop 118, or both).

Method 300 may also include at 312 step 320 of varying a size of first internal chamber 173A of first variable volume device 168A, a size second internal chamber 173B of second variable volume device 168B, or a size of both first and second internal chambers 173A and 173B.

Method 300 may also include at 312 step 322 of determining data indicative of an operating pressure of the intermediary heat exchange fluid. In an exemplary embodiment, adjusting the flow volume of thermal transport bus 102 may include adjusting the flow volume of thermal transport bus 102 in response to determining data indicative of the operating pressure of the intermediary heat exchange fluid.

Method 300 may also include at 312 step 324 of automatically adjusting the flow volume of thermal transport bus 102 in response to the pressure change within thermal transport bus 102.

It will be appreciated that the exemplary aspect of the method 300 depicted in FIG. 6 and discussed above is provided by way of example only. In other exemplary aspects, the method 300 may not include each of the steps described herein and depicted in FIG. 6. Additionally, or alternatively, in other exemplary aspects, the method 300 may include additional steps not described herein or depicted in FIG. 6.

A thermal management system in accordance with an exemplary embodiment present in this disclosure may allow for a gas turbine engine and aircraft including such a gas turbine engine to operate more efficiently. More particularly, inclusion of a thermal management system in accordance with an exemplary embodiment of the present disclosure may allow for a quicker response to leak or failure conditions of the gas turbine engine or the aircraft if they occur. Additionally, the heat exchange fluid used by a thermal management system in accordance with an exemplary embodiment of the present disclosure may be redirected by actively disengaging a heat exchanger in response to a detected leak or failure in a component fluidly connected to one of the heat exchangers.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method of detecting an airflow fault condition in a gas turbine engine, the method comprising: operating the gas turbine engine with a thermal transport bus having an intermediary heat exchange fluid flowing therethrough; determining a performance characteristic of the intermediary heat exchange fluid in the thermal transport bus is outside of a predetermined range, wherein the performance characteristic comprises a temperature, a pressure, a flowrate, or a combination thereof; and indicating an airflow fault condition in response to determining the performance characteristic is outside of the predetermined range.

The method of one or more of these clauses, further comprising: modifying a configuration of airflow in the gas turbine engine in response to the indicated airflow fault condition.

The method of one or more of these clauses, wherein modifying the configuration of airflow in the gas turbine engine comprises: selectively deactivating a first heat exchanger in fluid communication with the thermal transport bus; and selectively bypassing the first heat exchanger by sending a flow of air from the first heat exchanger to a second heat exchanger in fluid communication with the thermal transport bus.

The method of one or more of these clauses, further comprising: monitoring the performance characteristic of the intermediary heat exchange fluid, wherein monitoring the performance characteristic of the intermediary heat exchange fluid comprises sensing data indicative of the performance characteristic of the intermediary heat exchange fluid with a sensor, wherein sensing data indicative of the performance characteristic of the intermediary heat exchange fluid comprises sensing a piecewise change in the data indicative of the performance characteristic of the intermediary heat exchange fluid.

The method of one or more of these clauses, further comprising: monitoring the performance characteristic of the intermediary heat exchange fluid, wherein monitoring the performance characteristic of the intermediary heat exchange fluid comprises measuring the performance characteristic with a temperature sensor, a pressure sensor, or both.

The method of one or more of these clauses, wherein the performance characteristic is a differential temperature, a differential pressure, a differential flowrate, or a combination thereof.

The method of one or more of these clauses, further comprising:

modifying a configuration of the thermal transport bus in response to the indicated airflow fault condition by varying a position of a valve in fluid communication with the thermal transport bus.

The method of one or more of these clauses, wherein modifying the configuration of the thermal transport bus comprises modifying a configuration of a secondary circuit of the gas turbine engine by varying the position of the valve in fluid communication with the secondary circuit.

The method of one or more of these clauses, further comprising: monitoring the performance characteristic of the intermediary heat exchange fluid, wherein monitoring the performance characteristic of the intermediary heat exchange fluid comprises monitoring for an instantaneous change in the performance characteristic.

The method of one or more of these clauses, wherein the instantaneous change in the performance characteristic is defined by a step function of the performance characteristic.

The method of one or more of these clauses, further comprising: creating a data set representative of the performance characteristic of the intermediary heat exchange fluid, wherein determining the performance characteristic is outside of the predetermined range comprises identifying a portion of the data defining a step function.

The method of one or more of these clauses, further comprising: monitoring the performance characteristic of the intermediary heat exchange fluid, wherein monitoring the performance characteristic of the intermediary heat exchange fluid comprises monitoring for a gradual change in the performance characteristic.

The method of one or more of these clauses, wherein the airflow fault condition is indicative of a broken pipe of the gas turbine engine.

The method of one or more of these clauses, wherein operating the gas turbine engine with the thermal transport bus comprises: providing the intermediary heat exchange fluid to a heat exchanger; and providing a fluid flow through a duct of the gas turbine engine to the heat exchanger to exchange heat with the intermediary heat exchange fluid; wherein the airflow fault condition is a fault associated with the duct of the gas turbine engine, and wherein modifying the configuration of airflow in the gas turbine engine comprises modifying the airflow through the duct of the gas turbine engine.

The method of one or more of these clauses, wherein the thermal transport bus is configured to connect with a heat source heat exchanger, wherein the heat source heat exchanger comprises a cooled cooling air heat exchanger, a waste heat recovery heat exchanger, an air cooled oil cooler heat exchanger, or any combination thereof.

The method of one or more of these clauses, wherein the thermal transport bus is configured to connect with a heat sink heat exchanger, wherein the heat sink heat exchanger comprises a fuel cooled bus cooler heat exchanger, an air cooled bus cooler heat exchanger, or any combination thereof.

A gas turbine engine comprising: a turbomachine having compressor section, a combustion section, and a turbine section arranged in serial flow order; a thermal transport bus comprising one or more heat source heat exchangers, one or more heat sink heat exchangers, a bus fluidly connected to the one or more heat source heat exchangers and to the one or more heat sink heat exchangers; and a controller operably coupled to the turbomachine, the controller comprising one or more processors and memory, the memory storing instructions that when executed by the controller cause the gas turbine engine to perform the following operations: operate the gas turbine engine with the thermal transport bus having an intermediary heat exchange fluid flowing therethrough; determine a performance characteristic of the intermediary heat exchange fluid in the thermal transport bus is outside of a predetermined range, wherein the performance characteristic comprises a temperature, a pressure, or both; and indicate an airflow fault condition in response to determining the performance characteristic is outside of the predetermined range.

The gas turbine engine of one or more of these clauses, wherein the one or more heat source heat exchangers comprises a cooled cooling air heat exchanger, a waste heat recovery heat exchanger, an air cooled oil cooler heat exchanger, or any combination thereof.

The gas turbine engine of one or more of these clauses, wherein the one or more heat sink heat exchangers comprises a fuel cooled bus cooler heat exchanger, an air cooled bus cooler heat exchanger, or any combination thereof.

The gas turbine engine of one or more of these clauses, further comprising: a sensor connected to the bus and configured to communicate with the controller, wherein the sensor is further configured to monitor the performance characteristic of the heat exchange fluid; and one or more valves connected to the bus and configured to receive signals from the controller, wherein the one or more valves are further configured to modifying the configuration of airflow in the gas turbine engine.

We claim:

1. A method of detecting an airflow fault condition in a gas turbine engine, the method comprising:

operating the gas turbine engine with a thermal transport bus, the thermal bus including a first flow loop including a first compressor, the first flow loop configured to circulate a first intermediary heat exchange fluid flowing therethrough, wherein the first flow loop is a closed loop conduit, and a second flow loop including a second compressor, the second flow loop configured to circulate a second intermediary heat exchange fluid flowing therethrough, wherein the second flow loop is a closed loop conduit, wherein the first flow loop is fluidly isolated from and redundant to the second flow loop, wherein the first flow loop and the second flow loop are thermally coupled to a common heat source, wherein the first compressor and the second compressor are driven by a common drive system;

determining a performance characteristic of the first intermediary heat exchange fluid in the thermal transport bus is outside of a predetermined range, wherein the performance characteristic comprises a temperature, a pressure, a flowrate, or a combination thereof; and indicating an airflow fault condition in response to determining the performance characteristic is outside of the predetermined range.

2. The method of claim 1, further comprising:

modifying a configuration of airflow in the gas turbine engine in response to the indicated airflow fault condition.

3. The method of claim 2, wherein modifying the configuration of airflow in the gas turbine engine comprises:

selectively deactivating a first heat exchanger in fluid communication with the thermal transport bus; and selectively bypassing the first heat exchanger by sending a flow of air from the first heat exchanger to a second heat exchanger in fluid communication with the thermal transport bus.

4. The method of claim 1, further comprising:

monitoring the performance characteristic of the first intermediary heat exchange fluid, wherein monitoring the performance characteristic of the first intermediary heat exchange fluid comprises sensing data indicative of the performance characteristic of the first intermediary heat exchange fluid with a first sensor, wherein sensing data indicative of the performance characteristic of the first intermediary heat exchange fluid comprises sensing a piecewise change in the data indicative of the performance characteristic of the first intermediary heat exchange fluid.

5. The method of claim 1, further comprising:

monitoring the performance characteristic of the first intermediary heat exchange fluid, wherein monitoring the performance characteristic of the first intermediary heat exchange fluid comprises measuring the performance characteristic with a temperature sensor, a pressure sensor, or both.

6. The method of claim 1, wherein the performance characteristic is a differential temperature, a differential pressure, a differential flowrate, or a combination thereof.

7. The method of claim 1, further comprising:

modifying a configuration of the thermal transport bus in response to the indicated airflow fault condition by varying a position of a valve in fluid communication with the thermal transport bus.

8. The method of claim 7, wherein modifying the configuration of the thermal transport bus comprises modifying a configuration of a secondary circuit of the gas turbine engine by varying the position of the valve in fluid communication with the secondary circuit.

9. The method of claim 1, further comprising:

monitoring the performance characteristic of the first intermediary heat exchange fluid, wherein monitoring the performance characteristic of the first intermediary heat exchange fluid comprises monitoring for an instantaneous change in the performance characteristic.

10. The method of claim 9, wherein the instantaneous change in the performance characteristic is defined by a step function of the performance characteristic.

11. The method of claim 1, further comprising:

creating a data set representative of the performance characteristic of the first intermediary heat exchange fluid, wherein determining the performance characteristic is outside of the predetermined range comprises identifying a portion of the data defining a step function.

12. The method of claim 1, further comprising:

monitoring the performance characteristic of the first intermediary heat exchange fluid, wherein monitoring the performance characteristic of the first intermediary heat exchange fluid comprises monitoring for a gradual change in the performance characteristic.

13. The method of claim 1, wherein the airflow fault condition is indicative of a broken pipe of the gas turbine engine.

14. The method of claim 1, wherein operating the gas turbine engine with the thermal transport bus comprises:

providing the first intermediary heat exchange fluid to a heat exchanger; and providing a fluid flow through a duct of the gas turbine engine to the heat exchanger to exchange heat with the first intermediary heat exchange fluid;

wherein the airflow fault condition is a fault associated with the duct of the gas turbine engine, and wherein modifying the configuration of airflow in the gas turbine engine comprises modifying the airflow through the duct of the gas turbine engine.

15. The method of claim 1, the common heat source comprises a cooled cooling air heat exchanger, a waste heat recovery heat exchanger, an air cooled oil cooler heat exchanger, or any combination thereof.

16. The method of claim 1, wherein the first flow loop and the second flow loop of the thermal transport bus are configured to connect with a heat sink heat exchanger, wherein the heat sink heat exchanger comprises a fuel cooled bus cooler heat exchanger, an air cooled bus cooler heat exchanger, or any combination thereof.

* * * * *